April 14, 1970 J. NICKL 3,506,508

USE OF GAS ETCHING UNDER VACUUM PRESSURE FOR PURIFYING SILICON

Filed Feb. 25, 1965

3,506,508
USE OF GAS ETCHING UNDER VACUUM PRESSURE FOR PURIFYING SILICON

Julius Nickl, Neukeferloh, Germany, assignor to Siemens Aktiengesellschaft, a German corporation
Filed Feb. 25, 1965, Ser. No. 435,239
Claims priority, application Germany, Feb. 26, 1964, S 89,690
Int. Cl. H01l 7/00
U.S. Cl. 156—17 6 Claims

ABSTRACT OF THE DISCLOSURE

An etching process in a method of producing a silicon semiconductor device which avoids contamination of the device by foreign substances includes contacting the surface of a member composed of semiconductor material with a gaseous etchant chemically reactive with the semiconductor material under given reaction conditions of temperature and pressure so as to disintegrate the surface of the semiconductor member by forming a volatile oxide, and adjusting the reaction conditions so that volatile reaction products formed by the gaseous etchant and the semiconductor material are removed.

My invention relates to method of producing semiconductor devices.

In the known etching processes for semiconductor materials, a migration of impurity atoms into the material from the environment or due to contamination by etching agents is very difficult to prevent. The danger of contamination by impurities stemming from etching agents can be largely avoided by using etching agents of vaporous constitution. For the same purpose, it has been advisable to perform several etching steps in one reaction vessel, if possible.

It is an object of my invention to provide a semiconductor etching process that reliably affords any desired amount of etching without the danger of contaminating the etched material and with the aid of relatively simple processing equipment.

Another object of the invention is to afford a uniform elimination of material from a semiconductor body so as to obtain an etched surface of improved smoothness.

According to the invention I subject a semiconductor body to chemical etching by means of a gaseous or vaporous etching agent capable of loosening the semiconductor surface by chemical reaction, and I set the reaction conditions as required for the formation of volatile compounds of the semiconductor material.

Preferably employed is an oxidizing etchant which effects a surface oxidation of the semiconductor material, and the reaction is carried out to produce volatile oxides of the material.

According to one mode of performing the method of the invention, the surface of the semiconductor is oxidized in the first reaction phase, and the oxidized body is then tempered in a second reaction phase under reduced pressure to convert the previously formed oxide into a volatile oxide which is removed from the body. Preferably the tempering step is effected at temperatures between 900 and 1300° C. and at a pressure of $10^{-2}$–$10^{-6}$ torr.

According to another embodiment of the method, the semiconductor material is oxidized by tempering under reduced pressure in one operational step and removed by conversion to a volatile oxide. Such simultaneous oxidation and tempering treatment is performed, for example, at temperatures between 1000 and 1350° C. and at a pressure of less than $10_{-4}$ torr, and more particularly at $10^{-5}$ torr, with access of oxygen.

The method of the invention is particularly well suitable for silicon, but is not limited thereto. It may be used in the same manner for etching germanium, boron and other suboxide-forming elements. The oxidizing treatment results in volatile SiO, either directly or indirectly over $SiO_2$, which converts with Si to SiO. The SiO evaporates in the vacuum present in the reaction chamber.

Suitable etching agents are mixtures of steam and oxygen or steam, oxygen and nitric acid. Also applicable for the etching of semiconductor surfaces are other gaseous etching means, such as hydrogen, nitrogen, inert elemental or noble gases, halogens or mixtures thereof. However, the etching effect of these gases is lower under the same reaction conditions.

The etching process according to the invention may be applied for the production of virtually all semiconductor device components, such as transistors, rectifiers, and the like.

A particular advantage is the fact that the method requires relatively little equipment and also affords doping the semiconductor material directly upon removal of the surface layer, and, if desired, in the same reaction vessel. The method further secures removal of a uniform layer of slight roughness depth.

The invention will be further described with reference to the accompanying drawing in which.

Figure 1:
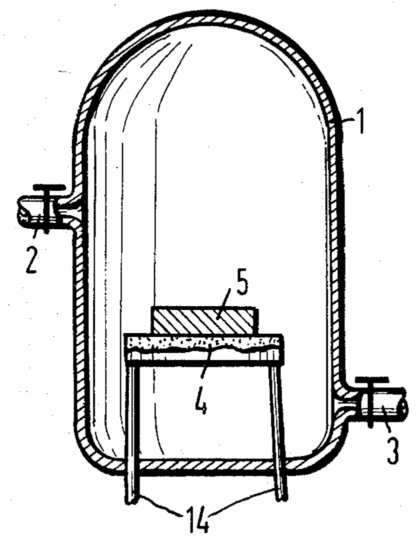
FIG. 1 shows schematically and in section an embodiment of processing equipment for the purpose of the invention.

Shown in FIG. 1 is a reaction vessel 1 of quartz having a gas inlet 2 and a gas outlet 3 equipped with respective valves for introducing and discharging the reaction gases. Mounted in the vessel is a heating table of graphite which is preferably coated with silicon or other semiconductor material identical with the material of the semiconductor bodies to be processed. The heater 4 has a flat top surface and is mounted on terminals 14 which extend to the outside of the vessel 1 for connection to a voltage source (not illustrated) by means of which the heater 4 is heated up to the required processing temperature. Placed on top of the heater 4 is a semiconductor crystalline body 5 consisting for example of a circular disc of silicon. The discs to be processed are produced in the conventional manner by slicing them with the aid of saws from a zone-melted monocrystalline rod of silicon. Thereafter the slices are lapped and mechanically polished.

After being brought into the reaction vessel, the discs are annealed in a hydrogen current at approximately 1150° C. Subsequently a mixture of steam and oxygen is introduced through the inlet 2. In this atmosphere, the silicon disc is coated at a temperature of 1200° C. with an oxide layer of about 1 to about 10 A. thickness. This thickness of the oxide coating depends on the amount of processing time, the reaction temperature, and the gas composition. After the supply of reaction gas is stopped, a pressure of from $10^{-2}$–$10^{-6}$ torr is established in the reaction vessel by pumping, while maintaining the temperature of about 1200° C. Then the coating of $SiO_2$ reacts with the silicon beneath the surface, and converts to SiO which evaporates under the prevailing reaction conditions.

The thickness of the removed layer is composed of the thickness of the oxide layer plus a layer of silicon adjustable by setting the processing conditions. If, for example, the thickness of the oxide coating is equal to $a$, the thickness of the actually removed layer is $1.1a$ to $2.3a$.

Figure 2:
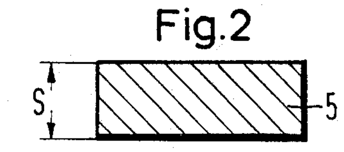
FIGS. 2 to 5 show schematically a semiconductor body in four different stages of the process performed in equipment according to FIG. 1.
Figure 3:
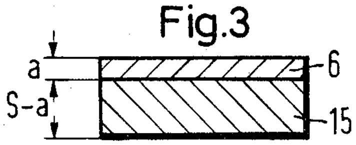
Figure 4:
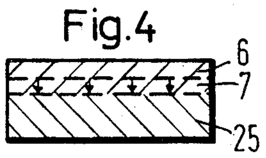
Figure 5:

FIG. 2 shows a silicon disc 5 whose thickness is denoted by S. As FIG. 3 shows, the oxidizing treatment results in an $SiO_2$-coating 6 having a layer thickness $a$. The remaining silicon body 15 then has the thickness S-$a$. During subsequent tempering, the $SiO_2$ reacts with the silicon, as shown in FIG. 4, and forms silicon oxide (SiO) in region 7. After evaporation of SiO the remaining silicon body 25 has a thickness of $S-e$, with $e=1.3a$, this being shown in FIG. 5.

The silicon discs treated according to this method have particularly even, well developed and smooth surfaces having a very slight roughness depth below 1 $\mu$m. Furthermore, the thickness of the layer to be removed may be very accurately adjusted by the corresponding selection of the reaction conditions.

The method may also be carried out by producing the oxide coating during evacuation. This permits performing the process in a single operational step.

Figure 6:
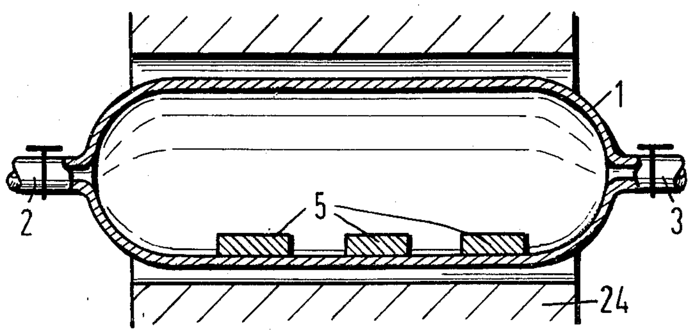
FIG. 6 shows schematically and in cross section another embodiment of apparatus for performing the method of the invention.

This method is carried out as follows. The mechanically pretreated, etched and smooth silicon discs are tempered in an oxygen-containing atmosphere under a pressure of $10^{-5}$ torr at temperatures between 1100–1150° C. For this purpose an artificial and defined leak may be provided to continuously suck an oxygen current through the reaction vessel. The oxygen molecules then form silicon monoxide directly with the silicon surface, and the monoxide evaporates under the prevailing reaction conditions. The device illustrated in FIG. 6 is particularly suitable for this mode of the method.

The reaction vessel 1, of quartz, with valve-controlled inlet and outlet ducts 2, 3 is located in a furnace or heater 24. Small amounts of oxygen enter into the vessel through the valve 2. Thus, volatile SiO is formed at the surface of the semiconductor disc 5. The monoxide evaporates off and is disintegrated at the colder places of the reaction vessel.

The last-mentioned method has the special advantage of being very simple, involving little cost and resulting in products of extreme purity. Furthermore, following the tempering process, a gas current charged with doping materials, may be passed over the etched specimens to effecting doping of the semiconductor material by diffusion in the same reaction vessel.

The method also offers the advantage that several specimens may be etched simultaneously. To effect a continuous process, the specimens to be etched may be continuously passed through the etching chamber by means of locks or sluices. The travel speed then determines the thickness of the layer removed by etching.

To those skilled in the art it will be obvious upon a study of this disclosure that my invention permits of various modifications and may be given embodiments other than particularly illustrated and described herein, without departing from the essential features of my invention and within the scope of the claims annexed hereto.

I claim:

1. In a method of producing a silicon device, an etching process avoiding contamination of the device by foreign substances, which comprises a first step of contacting the surface of a member composed of silicon with a gaseous etchant chamically reactive with the silicon under given reaction conditions of temperature ranging between 900° and 1300° C. and pressure ranging between $10^{-1}$ to $10^{-6}$ torr so as to form a nonvolatile oxide layer of the silicon, and a second step of reducing the pressure and tempering the silicon to transform the oxide layer into a volatile oxide of the silicon and simultaneously removing the volatile oxide from the silicon.

2. Process according to claim 1, wherein the surface of the semiconductor member is oxidized, and the reaction conditions are adjusted so that a volatile oxide of the semiconductor material is formed.

3. Process according to claim 1, wherein tempering of the semiconductor material is carried out at temperatures between 1000° C. and 1350° C. and at a pressure less than $10^{-4}$ torr.

4. Process according to claim 3, wherein the pressure at which the tempering is performed is at $10^{-5}$ torr.

5. Process according to claim 1, wherein the gaseous etchant is a mixture of water vapor and oxygen.

6. Process according to claim 1, wherein the gaseous etchant is a mixture of water vapor, oxygen and nitric acid.

References Cited

UNITED STATES PATENTS

| | | | |
|---|---|---|---|
| 2,744,000 | 5/1956 | Seiler | 156—17 |
| 2,802,760 | 8/1957 | Derick et al. | 148—189 |
| 3,328,199 | 6/1967 | Sirtl | 117—201 |
| 3,243,323 | 3/1966 | Corrigan et al. | 156—17 |

JACOB H. STEINBERG, Primary Examiner

U.S. Cl. X.R.

117—201; 148—1.5, 189